E. W. SMITH.
CARPET-SWEEPER.

No. 184,735.    Patented Nov. 28, 1876.

Attest:
Ourlos Flint.
Fred Benjamin

E. W. Smith
By his atty
Charles E. Foster

UNITED STATES PATENT OFFICE.

EMERY W. SMITH, OF BOSTON, MASSACHUSETTS.

IMPROVEMENT IN CARPET-SWEEPERS.

Specification forming part of Letters Patent No. 184,735, dated November 28, 1876; application filed October 10, 1876.

*To all whom it may concern:*

Be it known that I, EMERY W. SMITH, of Boston, Suffolk county, Massachusetts, have invented Improvements in Carpet-Sweepers, of which the following is the specification:

The object of my invention is an improvement in that class of carpet-sweepers in which the brush-shaft is made detachable to facilitate the cleaning of the brush; and the invention consists in certain devices, fully described hereafter, to facilitate the removal and insertion of the shaft; also, in an improvement in the bail.

Figure 1:
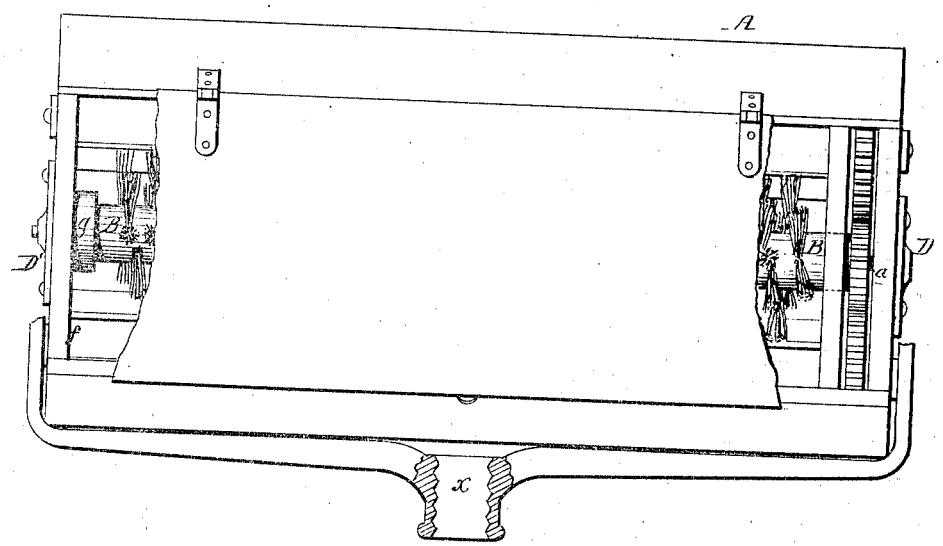
Figure 2:
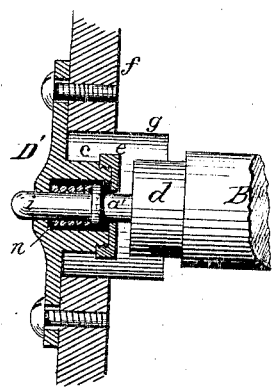

In the accompanying drawing, Figure 1 is a plan view (part of the cap being removed) of a sweeper with my improvements; Fig. 2, an enlarged sectional view.

The case A of the sweeper is made in the ordinary manner, and provided with bands or wheels for driving the brush-shaft B. On each end of the shaft is a cap or ferrule, $d$, from which projects a journal. At one end of the case is an adjustable metal plate, D, containing a socket or bearing for the adjacent journal $a$; but the other plate, D', is provided with a hollow enlargement or boss, $c$, which projects inward through an opening in the end $f$ of the case, and is provided with a cap, $e$, having an opening to receive the journal $a'$. A pin, $i$, slides in the hollow boss $c$, its stem projecting through the opening in the plate D', and its head being maintained in contact with the end of the journal $a'$ by a spring, $n$, that throws it inward. An annular flange, $g$, extends from the end $f$ of the box, and incloses the adjacent end of the brush-shaft, preventing strings from being wound about the journal. When the shaft is in its position the end is not in contact with the boss $c$, but is so far therefrom that when it is moved longitudinally into contact therewith the opposite journal $a$ will be withdrawn from its socket, permitting the shaft to be detached.

In replacing the shaft the journal $a'$ is first passed into the opening in the end of the boss $c$, the shaft is thrust toward the latter, and brought with its journal $a$ opposite the opening in the plate D, when it is released, and the spring $n$ will act on the pin $i$ and throw the shaft longitudinally, insert the journal $a$ in the opening, and maintain it there.

It will be seen that the journal $a'$ closes the opening in the boss, that the stem of the pin $i$ closes the outer opening, and that the head of the pin covers the inner opening when the shaft is removed, thus most effectually preventing the access of dust to the spring-chamber at all times.

It will be apparent that a rubber spring may be substituted for the coiled metal spring, a plate being substituted for the head of the bolt or pin $i$, and that the hollow boss may be secured within the case independent of the plate D'.

One of the main advantages of the arrangement described results from the fact that it is not necessary to bore any recess or opening in the shaft.

In the sweeper for which Letters Patent were granted to me on the 19th day of September, 1876, the bail I had a threaded socket to receive the handle; but said socket was closed at the bottom, thus preventing the handle, when loose, from being screwed farther in and tightened. I overcome this difficulty by making the socket $x$, Fig. 1, open at both ends, permitting the handle to be carried inward until wedged perfectly tight.

I claim—

1. The combination of the shaft, having a journal at each end, and a hollow boss, $c$, secured to the case, having an opening to receive one of the journals, and containing a spring, by which the shaft is thrown toward the opposite bearing, for the purpose set forth.

2. The plate D', carrying the hollow boss $e$, having an opening at the end for the reception of the journal of the brush-shaft, and containing a spring, as described.

3. The combination of the plate D', boss $c$, and spring-pin $i$, the stem extending through the opening in the plate, and the head covering the opening at the end of the boss, as set forth.

4. The bail provided with a screw-socket, $x$, open at both ends, as set forth.

In testimony whereof I have signed my name to this specification in the presence of two subscribing witnesses.

EMERY W. SMITH.

Witnesses:
CHAS. DELANO,
CHARLES N. CLARK.